July 18, 1939. H. L. THORSON 2,166,830
METAL RADIO TUBE
Filed July 14, 1937

Inventor:
Harry L. Thorson,
by Harry E. Dunham
His Attorney.

Patented July 18, 1939

2,166,830

UNITED STATES PATENT OFFICE 2,166,830

METAL RADIO TUBE

Harry L. Thorson, Schenectady, N. Y., assignor to General Electric Company, a corporation of New York Application July 14, 1937, Serial No. 153,541

8 Claims. (Cl. 250—27.5)

The present invention relates to metal radio tubes and more particularly to the construction of that portion of the envelope through which the leading-in conductors extend.

In the manufacture of all-metal tubes, it is customary to provide a cylindrical shell closed at one or both ends by metal headers of various kinds. These headers are hermetically sealed as by welding or brazing to the shell. They provide a place for the seals through which the leading-in conductors pass into the envelope. The header may also support the electrode structure, and in addition, carry a tubulation by which the interior of the envelope can be evacuated.

When proper manufacturing care is exercised, headers of the prior art are usually satisfactory, but it has been found in certain types of headers that during the welding operation, strains are set up in the glass which insulates the conductors from the envelope. These strains give rise to a faulty seal. In order to avoid these strains, headers of special design have been provided, but such headers are usually of a complicated structural character and necessarily expensive.

Figure 1:
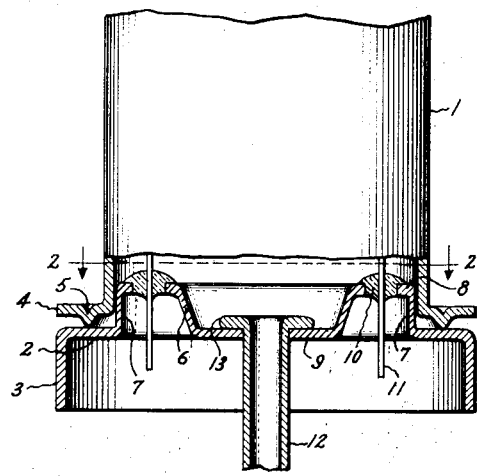
Figure 3:
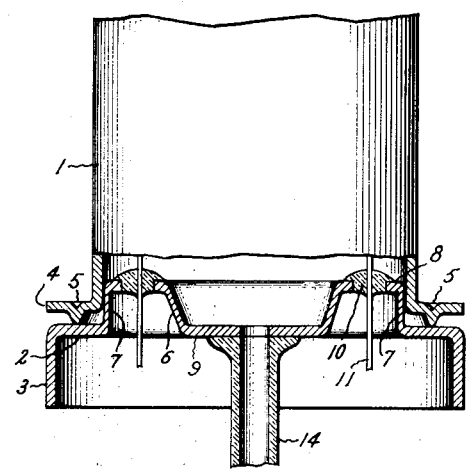
Figure 2:
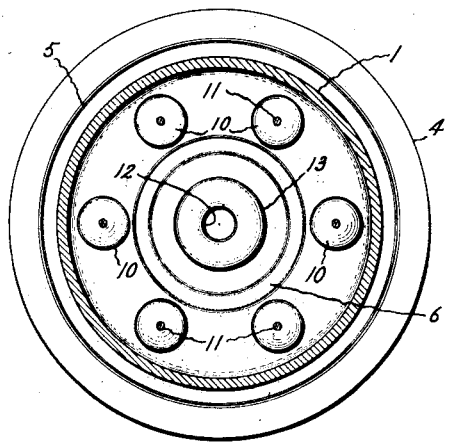

An object of the invention is to provide an improved and simplified form of header which can be welded or otherwise subjected to heat or rough physical treatment without causing strain or any other fault in the seals formed in the header and yet is relatively inexpensive to manufacture. This object is attained in brief by providing the header with an offset portion which carries the seals and is so designed as to be relatively flexible. Moreover, this offset portion serves to remove the seals a considerable distance from any possible source of heat or mechanical strain. The invention will be better understood when reference is made to the following specification and the accompanying drawing in which Fig. 1 is an elevational view, partly in section, of a tube provided with a header improved in accordance with the present invention. In this figure, the header is provided with a metal evacuating tubulation. Fig. 2 is a section taken across line 2—2 in Fig. 1; and Fig. 3 shows a header similar to that shown in Fig. 1 except that the evacuation tubulation is made of glass.

Referring more particularly to Figs. 1 and 2, numeral 1 designates the cylindrical shell of a metal tube containing one or more electrodes (not shown). The shell is preferably made of steel or iron. The upper end of the envelope (not shown) is closed in any suitable manner, for example, by means of a circular metal header or a portion integral with the envelope. The lower end, as shown, is closed by a circular header having a radially extending peripheral flange portion 2 and a central portion which preferably carries the electrode assembly and the evacuating tubulation. This header may be provided with a skirt 3 to which a base (not shown) is secured. The header is secured to the shell 1 at the flange portion, preferably by welding or brazing, and for this purpose the shell is provided with a flared rim 4. A groove or corrugation 5, preferably V-shaped, is formed in this rim and is conveniently of a circular configuration. This groove is preferably formed by pressing the metal outwardly on the lower surface of the flange 4, leaving a sharp ridge or corrugation which rests against the header. A pair of hollow cylindrical welding electrodes (not shown) which bear with considerable pressure against the rim 4 and the flange portion 2 on opposite sides thereof, may be employed to weld or braze these elements together. The ridge on the rim flattens itself against the portion 2 due to the pressure of the welding electrodes and tends to even up or smooth out any irregularity in the abutting surfaces. Thus a single welding impulse or "shot" is all that is necessary to make a hermetic seal between the shell and the header. As the corrugation straightens out during the welding operation, the rim 4 moves freely in the horizontal direction and cannot cause warping of the surfaces. If the corrugation had been provided in the header 2 instead of in the rim 4, the central part 9 of the header might bow or warp as the result of the metal being pushed inwardly when the corrugation is flattened by the clamping effect of the welding electrodes.

It has been found that unless special precaution be taken, any glass-to-metal seals provided in the header may crack due to the heat of the weld, and mechanical strain on the seals introduced by the welding electrodes or imposed by the expansion and contraction of the metal parts of the envelope when heating and cooling the tube. In order to eliminate this possibility, I provide a circumferentially extending embossed portion or depression formed of two concentric cylinders 6, 7 joined together, preferably integrally, by a flat ring 8 which is in a different horizontal plane from the portion 2. The ring 7, which may be regarded as an intermediate member connecting the flange portion of the header to the central portion thereof, extends transversely to the principal plane of the header. Furthermore it is of such a diameter as to fit loosely within the shell so as to be capable of flexing independently thereof. The inner ring 6 is integrally joined to a centrally positioned flat disk 9 which may extend in the same horizontal plane as the flat portion 2. The ring 6 and the disk 9 thus form a well or countersunk compartment which offers ample room for making the necessary electrical connections within the envelope. As will be noted, the header takes the form of a skirted ring having a circumferentially extending U-shaped depression bounded by the members 6, 7, and 8.

The electrodes (not shown) within the envelope may be supported from seals 10 of a fusible vitreous material such as glass which fills apertures in the member 8. The glass preferably has the same coefficient of thermal expansion as the metal of the header up to and including the softening temperature of the glass. Glass and metal of this character are known in the art. As many leads are provided as are necessary and are preferably arranged along the line of a circle concentric with the interior of the shell 1 as shown in Fig. 2. Leading-in conductors 11 for the electrode pass through these seals to the exterior of the envelope.

It is apparent that due to the fact that the portion of the header in which the seals are positioned is offset or is in a different plane from the portion at which the welding operation takes place, any heat or mechanical strain introduced during that operation or at any other time is not communicated directly to the seals. Much of the heat or strain is absorbed or dissipated by the ring 7 before the seal is reached. By extending the ring 7 in a vertical direction, as shown, this ring obviously is of much greater length than if it extended in the horizontal direction, and therefore, the ring offers greater opportunity for more completely absorbing or dissipating the heat or strain. In order even further to enhance the facility with which it serves this purpose, the ring 7 may be made quite thin, thereby offering considerable flexibility. An evacuating tabulation 12 of metal may be welded or brazed to the disk 9 and for this purpose, is provided with a flanged end 13. In order that no mechanical strain introduced at this time shall be communicated to the seals 10, the ring 6 may be made thin, as in the case of the ring 7, and for the same reason. The tubulation is pinched after the evacuation is completed and the excess snipped off, as is well known in the art. The header shown in Fig. 3 is the same as that described except that instead of employing a metal evacuating tubulation, a tubulation 14 of glass is used. As in the case of the glass used in the seal, the glass tubulation 14 should have the same coefficient of thermal expansion as the metal to which it is joined.

What I claim as new and desire to secure by Letters Patent of the United States is:

1. An electron discharge device comprising a cylindrical shell containing an electrode, a metal disk header welded at its periphery to the shell, an evacuating tubulation secured to the header, said header being provided with an annular depression of substantial depth, and a seal for said leading-in conductor located in a wall of said depression.

2. A stem for electron discharge devices, comprising two spaced concentric metal cylinders integrally joined at their ends by a transverse section to form a ring U-shaped in cross-section, an annular flange extending radially outward from the rim of the outer cylinder of the ring, a plurality of perforations in said transverse section and lead-in conductors sealed gas tight therein by vitreous insulating material.

3. An electrical device including the combination of a cylindrical metal shell and a circular header closing one end of the shell, wherein the header comprises a radially extending metal flange portion which is joined to the shell by means of a fused metal joint, a central portion having lead-in connections sealed therethrough and a circumferentially extending intermediate portion connecting the said flange portion and the said central portion and extending for a substantial distance transversely to the principal plane of the header, the said intermediate portion being free of the shell and capable of flexing independently thereof so as to protect the lead-in seals from the effects of expansive movements of the parts of the device incident to the formation of the said fused metal joint.

4. An electrical device including the combination of a cylindrical metal shell having a radially extending flange at one end thereof, a circular header having a peripheral flange portion abutting against and hermetically joined to the said shell flange, and lead-in conductors sealed through a central portion of the header, the said header including a relatively flexible circumferentially extending metal portion which extends transversely to the said flange portion of the header and which serves to connect such portion with the portion of the header through which the lead-in conductors are sealed.

5. An electrical device including the combination of a cylindrical metal shell, a circular header closing one end of the shell and joined peripherally thereto by means of a fused metal joint, lead-in connections sealed through the header and a circumferentially extending depression of substantial depth provided in the header in a region adjacent the outer periphery thereof but radially inwardly displaced from the shell, the said depression increasing the radial flexibility of the header and thereby protecting the lead-in seals from expansive movements of the parts of the device incident to the formation of the said fused metal joint.

6. An electron discharge device comprising a shell containing an electrode and closed by a header and a lead-in conductor for said electrode, said header including a peripheral flange and having a circular depression which is U-shaped in cross section so as to comprise two lateral walls joined by a transverse portion, said conductor being sealed in said transverse portion and said flange being secured to said shell.

7. An electron discharge device comprising a shell containing an electrode and closed by a header, and a lead-in conductor for said electrode, said header including a circular depression which is U-shaped in cross section so as to comprise two lateral walls joined by a transverse portion, said conductor being sealed in said transverse portion, a circular member peripherally joined to the rim of the inner wall of the depression and extending radially inwardly therefrom, an evacuating tubulation secured to said circular member and an annular flange extending outwardly from the rim of the outer wall of the depression and secured to said shell.

8. An electrical device including a cylindrical metal shell, a circular header peripherally joined to one end of the shell by means of a fused metal joint, a lead-in conductor projecting through a central portion of the header, and a quantity of fusible vitreous material sealed directly to the metal of the header and insulatingly supporting the lead-in conductor therefrom, the said header including a circumferentially extending metal portion which extends transversely to the principal plane of the header in a region between the periphery thereof and the location of the said lead-in conductor, such circumferentially extending portion serving to increase the radial flexibility of the header and thereby to protect the said vitreous material from strains incident to expansion of the parts.

HARRY L. THORSON.